United States Patent [19]

Allen et al.

[11] Patent Number: 4,963,211
[45] Date of Patent: Oct. 16, 1990

[54] METHOD OF AND MACHINE FOR WINDING TUBES FROM STRIP

[75] Inventors: Peter Allen, Columbia, Md.; Sydney Molyneux, Brisbane, Australia

[73] Assignee: Danby Pty., Ltd., Queensland, Australia

[21] Appl. No.: 362,454

[22] PCT Filed: Nov. 26, 1987

[86] PCT No.: PCT/AU87/00403
§ 371 Date: May 25, 1989
§ 102(e) Date: May 25, 1989

[87] PCT Pub. No.: WO88/03865
PCT Pub. Date: Jun. 2, 1988

[30] Foreign Application Priority Data

Nov. 26, 1986 [AU] Australia .................. PH9166

[51] Int. Cl.⁵ .................. B32B 7/00; B32B 31/00
[52] U.S. Cl. .................. 156/195; 156/191; 156/450
[58] Field of Search .......... 156/143, 184, 187, 191, 156/192, 195, 443, 446, 447, 450; 138/120, 122, 129, 135, 144, 154, 173; 72/49, 50

[56] References Cited

U.S. PATENT DOCUMENTS

| 2,731,040 | 1/1956 | Warburton | 156/195 X |
| 4,167,645 | 9/1979 | Carey | 156/195 X |
| 4,308,082 | 12/1981 | Menzel | 156/195 X |
| 4,375,381 | 3/1983 | Carlson et al. | 156/195 |
| 4,490,200 | 12/1984 | Dillon | 156/143 |
| 4,714,508 | 12/1987 | Chivens et al. | 156/195 |

Primary Examiner—William A. Powell
Attorney, Agent, or Firm—Oblon, Spivak, McClelland, Maier & Neustadt

[57] ABSTRACT

A machine winds tubes from strip (41) of the type having side flanges (43) with intermediate flanges (44) between, the strip (41) being fed into an annular space (21) between a cylindrical outer sleeve (18) fixed to a base plate (10) and a cylindrical driven core (20) rotatable coaxially within the sleeve (18). A series of pressure rollers (37) are mounted along a helical path on the sleeve (18), each entering the annular space (21) by way of an opening (37) in the sleeve, one such opening (37) being an inlet opening for the strip (41). The rollers (37) press the strip (41) into frictional engagement with the rotating core (20) and guide it to form a helix with closely adjacent convolutions. Also fed into the annular space (21) is a longitudinally recessed locking strip (47) which the rollers (37) press into locking engagement with the adjacent side flanges (43) of successive convolutions of the helically wound strip (41).

10 Claims, 3 Drawing Sheets

METHOD OF AND MACHINE FOR WINDING TUBES FROM STRIP

BACKGROUND OF THE INVENTION (1) Field of the Invention

THIS INVENTION relates to a method of, and machine for, winding tubes from strip.

(2) Prior Art

Australian Patent No. 530,251 and Patent Application No. 15562/83, both in the name of Rib Loc Hong Kong Ltd. disclose machines for producing tubes of helically wound extruded plastic strip having at its side complementary rib and groove formations which, in successive convolutions of the helix, are caused to interlock by a joining roller.

BRIEF DESCRIPTION OF THE INVENTION

The present invention has been devised with the general objects of providing a machine which is particularly efficient in the production of tubes wound from strip, and a method of making such tubes.

Other objects achievable in preferred embodiments of the invention are to provide such a machine which may be quickly and easily modified to produce such tubes of different diameters, which is particularly compact and so well suited for lowering into a manhole for the production of a tube projected as a liner into a sewer, and which, though simple and economical to manufacture, is sturdy and durable in use.

With the foregoing and other objects in view, the invention resides broadly, in one aspect, in a machine for winding tubes from strip including a base; a substantially cylindrical core mounted rotatably on the base and defining the internal diameter of a tube to be formed, means for rotating the core; an annular outer sleeve mounted on the base coaxially about the core and forming an annular space between them; an inlet opening in the sleeve to the annular space; means for guiding a tube forming strip through the inlet opening to the annular space; a series of pressure rollers mounted on the sleeve in a helical path and entering the annular space to urge the strip into frictional engagement with the rotating core and to guide it to form about the core a helix with closely adjacent convolutions; locking means being provided for locking together the said adjacent convolutions.

Preferably the strip is formed with longitudinal side ribs and a series of intermediate ribs between and parallel to them, and the adjacent side ribs of succeeding convolutions are locked together by a longitudinal grooved or recessed locking strip guided through the inlet opening and acted on by the pressure rollers to engage on and lock together the said adjacent side ribs.

Means are preferably provided for introducing glue to the longitudinal groove or recess of the locking strip before its entry to the inlet opening.

The core and the assembly of the outer sleeve and pressure rollers are preferably interchangeable with others for the production of tubes of different diameters.

Other features of the invention will become apparent from the following description.

BRIEF DESCRIPTION OF THE DRAWINGS

In order that a preferred embodiment of the invention may be readily understood and carried into practical effect, reference is now made to the accompanying drawings, wherein.

DETAILED DESCRIPTION OF THE PREFERRED EMBODIMENT

Figure 1:
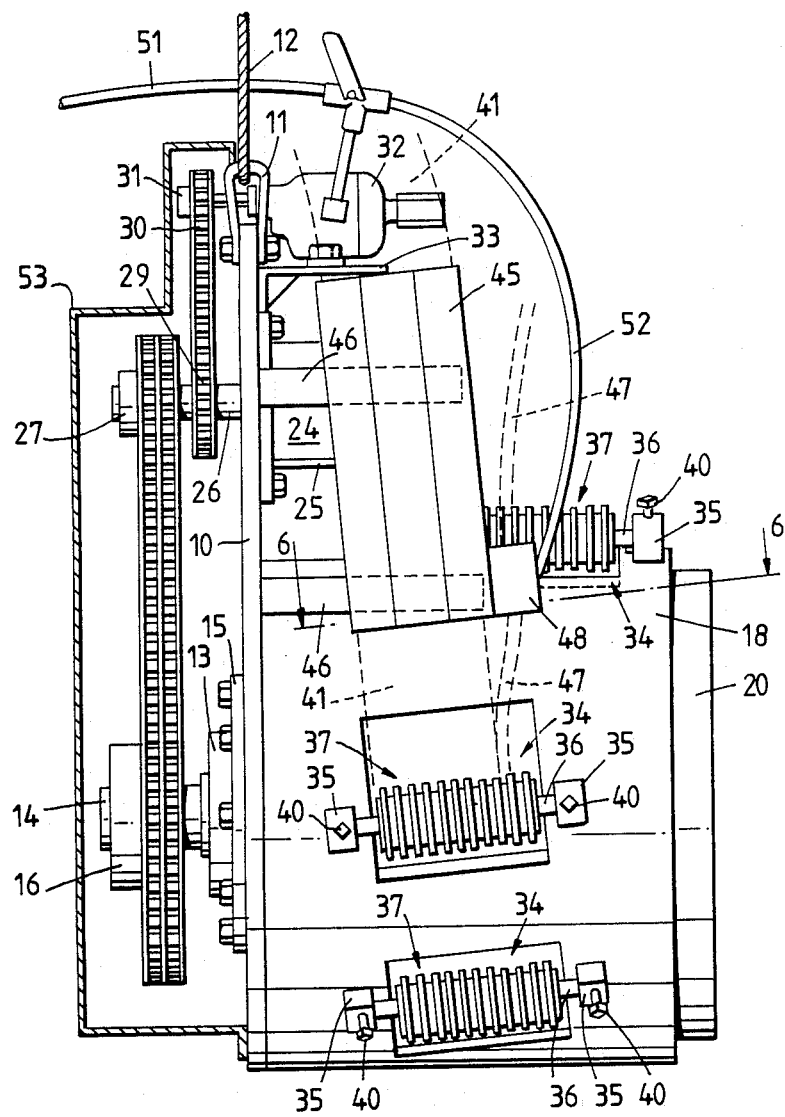
FIG. 1 is a partly broken-away side elevational view of a machine according to the invention.
Figure 2:
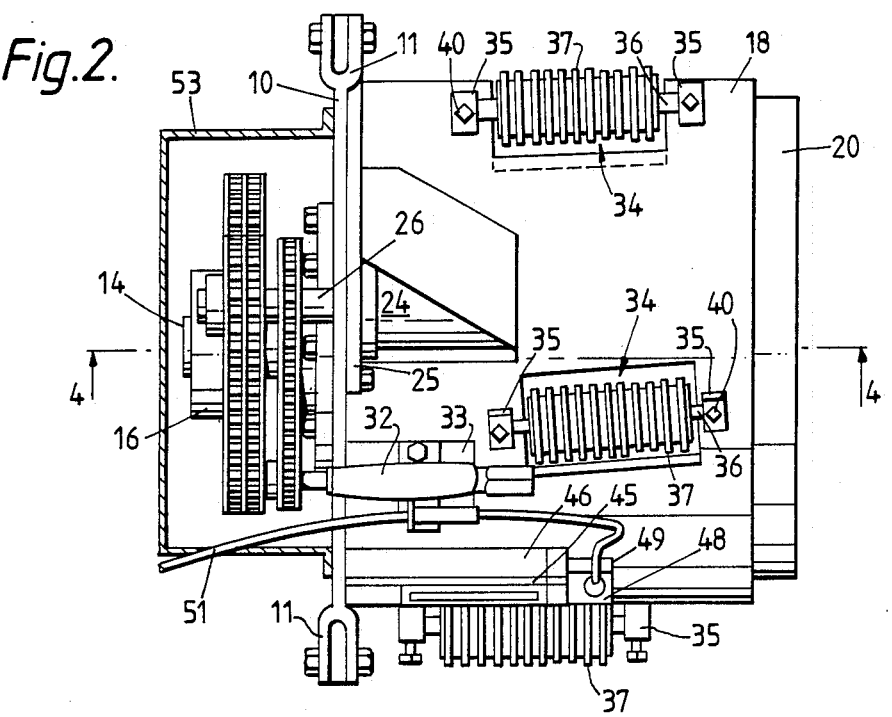
FIG. 2 is a partly broken-away plan view of the machine.

The machine illustrated includes an upright base plate 10 having at its top corners shackles 11 to which are attached cables 12 from a winch or the like (not shown) by means of which the machine may be lifted and lowered, for example, into a man-hole.

The base plate 10 is apertured to accept the housing 13 for the bearings of a main shaft 14, the housing extending forwardly of the base plate 10 and having a peripheral flange 15 bolted to the rear face of the base plate.

A double sprocket 16 is keyed on the rear end of the main shaft 14, and an annular mounting plate 17 is welded or otherwise secured on the front part of the shaft.

A cylindrical outer sleeve 18 is fixed on the front face of the base plate 10, coaxially with the main shaft 14, the sleeve having at its rear end an internal flange 19 which is bolted to the base plate. The bottom of the outer sleeve 18 is level with the bottom edge of the base plate 10.

A cylindrical core 20 is rotatably mounted coaxially within the outer sleeve 18 so that an annular space 21 is formed between them. The core is divided by an annular median plate 22, which is engaged on the front end of the main shaft 14 and bolted to its mounting plate 17. A section of the periphery of the core 20 is slightly reduced in diameter to form a seating for a rubber or like girdle 23, formed with a tread which is hereinafter described, and which has an outer diameter slightly greater than that of the remainder of the core 20, the surface of which, in front of the girdle, is of polished steel.

A hydraulic motor 24 is mounted in front of the base plate 10 on an adjustable carrier bracket 25, the motor shaft 26 passing through a slotted hole in the carrier plate to carry, behind the base plate, a double sprocket 27 connected by endless chains 28 to the double sprocket 16 on the main shaft 14. The motor shaft 26 also carries a sprocket 29 connected by a chain 30 to a sprocket 31 on the shaft of a glue pump 32 mounted on a bracket 33 fixed on the front of the base plate 10.

The outer sleeve 18 is formed with a series of openings 34 arranged in a helical path about the sleeve. At both ends of each of these openings, there are provided bearing blocks 35 for the shaft 36 of a pressure roller 37, shown more particularly in FIG. 5. Each of these pressure rollers, which may be of a tough resilient plastics material, is formed with a series of equally spaced circumferential grooves 38 separated by annular ribs 39 of which two succeeding ribs, indicated at 39a, are of somewhat lesser diameter than the others. Each of the rollers 37 extends for some distance through its opening 34 to approach, but not contact, the rotatable core 20. The roller shafts 36 are engaged in the bearing blocks 35 for adjustment, radially with respect to the core 20, by means of adjustment screws 40.

Figure 5:
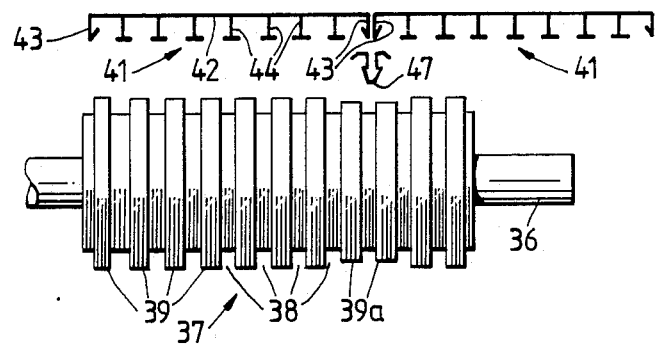
FIG. 5 is a detail drawing, to enlarged scale, of a pressure roller of the machine and strips interlocked thereby.

The tube forming strip 41, shown in section in FIG. 5, is an extruded strip with a base 42 with side flanges 43 having hooked extremities, and with a series of T-section flanges 44 between the side flanges 43 in equally spaced arrangement corresponding to the spacing of the pressure roller grooves 38.

A roll (not shown) of the tube forming strip 41 may be carried on a reel (not shown), from which an end of the strip is carried to a strip guide 45 mounted in front of the base plate 1, in laterally adjustable manner, on a pair of brackets 46. The strip guide 45 directs the tube forming strip downwards and more or less tangentially, with respect to the outer sleeve 18, to pass through the opening 34 of one of the pressure rollers 37 and between that pressure roller and the rotatable core 20. The strip guide 45 is also arranged obliquely, as shown in FIG. 1, to direct the tube forming strip to the helical path along which the pressure rollers 37 are arranged and onto that part of the core 20 encircled by the rubber or like girdle 23. The tread of this girdle is in the form of grooves which are substantially parallel to the axes of the pressure rollers 37.

Figure 3:
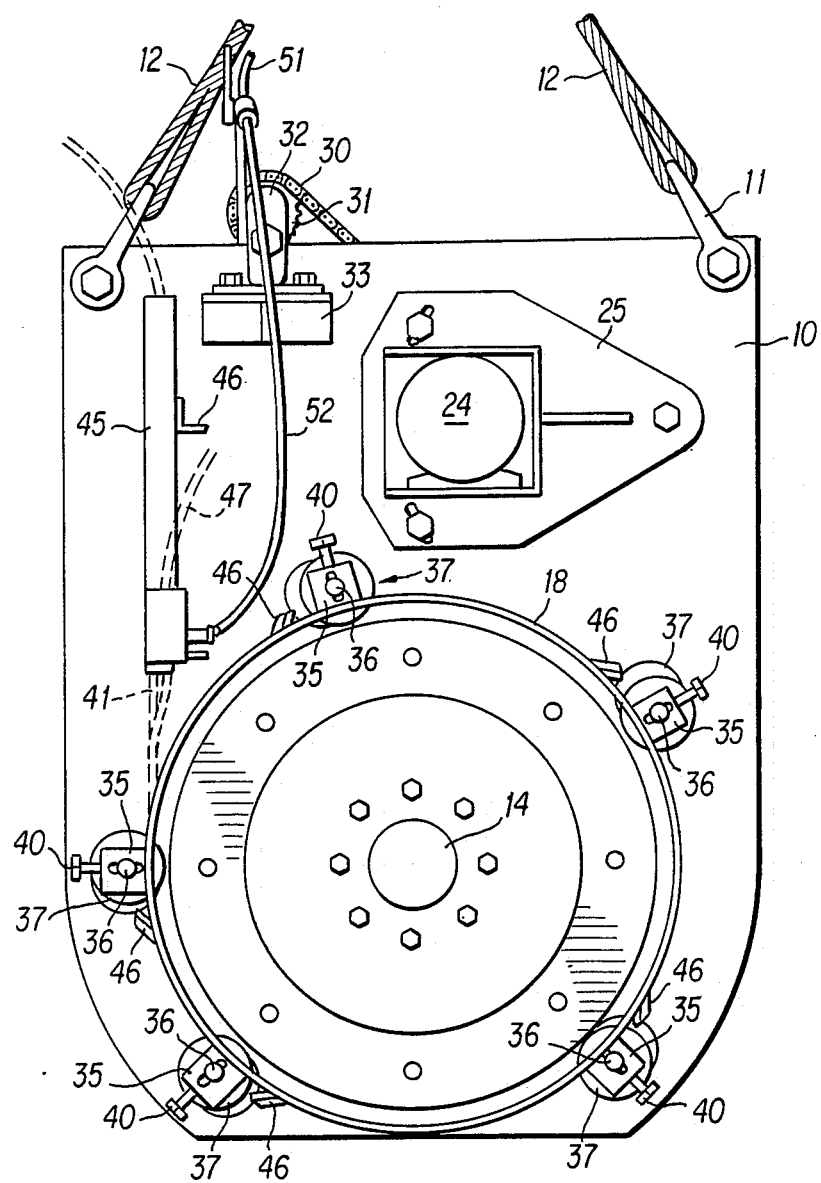
FIG. 3 is an end elevational view of the machine.
Figure 4:
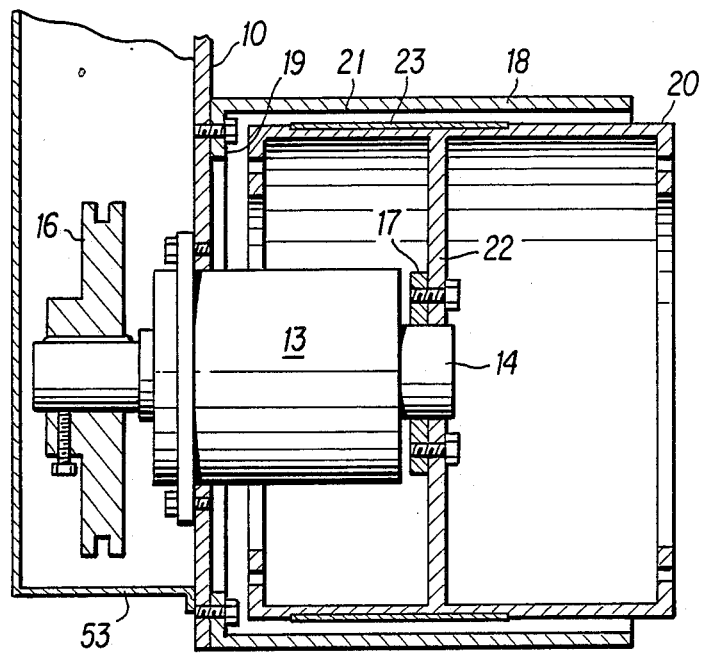
FIG. 4 is a sectional view of the lower part of the machine taken along line 4—4 in FIG. 2.

Rotation of the core 20 causes the tube forming strip 41 to pass around the core in a helical path so that, after the completion of one rotation of the core 20 two parts of the strip lie closely adjacent, as shown in FIG. 5, the adjacent hooked side flanges 43 of the two parts of the strip being located in the groove 38 between the two reduced-diameter annular ribs 39a of a pressure roller 37. The opening 34 through which the tube forming strip 41 is introduced from the strip guide 45 is of increased width, as shown in FIG. 1, to give easy entry; and the far edge of each of the openings 34 is bent outwardly, as shown particularly at 46 in FIG. 3, to ensure that the strip, during its travel, does not become blocked, but is guided between the core 20 and the outer sleeve 18.

Figure 6:
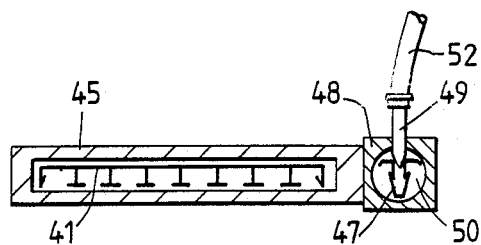
FIG. 6 is a sectional view, to larger scale, along line 6—6 in FIG. 1.

When a convolution of the helical path of the tube forming strip 41 has been completed, the two adjacent parts of the strip are locked together by a locking strip 47 which may be fed from a reel (not shown) to a locking strip guide 48 adjacent to the strip guide 45. The locking strip 47, as shown in FIGS. 5 and 6, is of open arrow-head configuration, with oppositely directed base flanges, and is capable of being pressed down onto, and locking together, the two adjacent hooked side flanges 43 of the two parts of the tube forming strip 41. The locking strip is applied by feeding it, from the locking strip guide 48, through the opening 34 of the first of the pressure rollers 37 and between its annular ribs 39a, the reduced diameters of which allow for the thickness of the base flanges of the locking strip superimposed on the base portions 42 of the adjacent tube forming strips 41.

For better interconnection of the convolutions of the tube forming strip, it is preferred that glue be introduced into the open arrow-head part of the locking strip. This is done by a glue nozzle 49 extending radially into the round-section passage 50 in the locking strip guide 48 through which the locking strip passes. The glue pump 32 draws glue from a reservoir (not shown) by way of a hose 51 and delivers it under pressure to the nozzle through a hose 52.

With continued rotation of the core 20 the helically wound tube forming strip 41, its adjacent convolutions locking and adhesively secured together by the locking strip 47, form, between the rotating core 20 and the outer sleeve 18, a tube of which the internal diameter is determined by the diameter of the core. This tube, as it is formed, is expelled from the open end of the outer sleeve 18, the treaded girdle 23 preventing circumferential slippage on the core but allowing axial slippage of the formed tube over the core's girdle and its polished front part.

The working parts of the machine behind the base plate 10 are shielded by a chain guard 53.

The machine may be used to line a sewer. When the formation of a tube has been commenced, as described, the machine may be lowered by a winch or the like into a manhole, aligned with the sewer, and put into operation to form a lining tube which is impelled forwardly into the sewer. Because of its compact form the machine can be installed for this purpose without deepening or widening the manhole.

If it is required to produce a tube of greater or lesser diameter from the strip, the machine may be quickly and easily modified by the interchanging of the core 20 and outer sleeve 18 (with its associated parts) for others of larger or smaller diameter. The core may be removed by unbolting its median plate 22 from the main shaft flange 17, and the outer sleeve may be removed by unbolting its internal flange 19 from the base plate 10.

Although the operation of the machine has been described and illustrated with reference to the production of tube from the extruded plastic strip 43 and the locking strip 47, it will, with minor modifications, be found very suitable for the production of tube from the well-known plastic strip sold under the trade mark "Rib Loc". Strip of this character is used without a locking strip being required as the rib and groove formations of adjacent convolutions of the helix become interlocked under pressure applied radially with respect to the helix. If the circumferential grooves 38 of the pressure rollers 37 conform to the ribs of the "Rib Loc" strip, it is necessary only that each roller have one, instead of two, of the reduced-diameter annular ribs 39a. If it should be desired that the joint of succeeding convolutions of the helix should be made more secure and gas- and water-tight, the glue nozzle 49 is arranged to inject the glue into the longitudinal groove of the strip.

The invention will be found to be very effective in achieving the objects for which it has been devised, and minor modifications of constructional detail and design which will be readily understood by skilled persons are considered to lie within the scope of the invention hereinafter claimed.

We claim:

1. A machine for winding tubes from strip including:
    a base;
    a substantially cylindrical core mounted rotatably on the base and defining the internal diameter of a tube to be formed;
    means for rotating the core;
    an annular outer sleeve mounted on the base coaxially about the core and forming an annular space between them;
    an inlet opening in the sleeve to the annular space;
    means for guiding a tube forming strip through the inlet opening to the annular space;
    a series of pressure rollers mounted on the sleeve in a helical path and entering the annular space to urge the tube forming strip into frictional engagement with the rotating core and to guide it to form about the core a helix with closely adjacent convolutions; and locking means for locking together the said adjacent convolutions; wherein:

the tube forming strip of resilient material having longitudinal side flanges and a series of spaced longitudinal flanges which are engaged in, and guided by, a series of spaced circumferential grooves, separated by annular ribs, about the pressure rollers; and the locking means includes:

a longitudinal recessed locking strip of resilient material;

means for guiding the locking strip through the inlet opening to the adjacent convolutions of the tube forming strip;

the pressure rollers being arranged to press the locking strip into locking engagement about the adjacent side flanges of the convolutions.

2. A machine according to claim 1 wherein:

means are provided for injecting glue into the longitudinal recess of the locking strip prior to its entering the inlet opening.

3. A machine according to claim 1 wherein:

the core is encircled by a girdle of resilient material treaded with ribs substantially perpendicular to the convolutions of the helically-wound tube forming strip.

4. A machine according to claim 1 wherein:

each pressure roller is mounted on the outer sleeve for adjustment in a direction radial to the core.

5. A machine for winding tubes from strip including:

a normally upright base plate;

a main shaft, its axis perpendicular to the base plate, rotatable in bearings on the base plate;

a cylindrical core mounted on the main shaft;

a motor on the base plate for driving the main shaft;

an outer sleeve fixed to the base plate coaxially about the core with an annular space between the two;

a series of pressure rollers, having spaced circumferential grooves separated by annular ribs mounted on the outer sleeve in a helical path to which their axes are perpendicular, each of the pressure rollers entering the annular space through an opening in the sleeve, one such opening being an inlet opening;

a guide on the base plate for guiding a tube forming strip, of resilient material, through the inlet opening to the annular space for frictional engagement between the core and the pressure rollers which, upon rotation of the core, guide the tube forming strip to form about the core a helix with closely adjacent convolutions, longitudinal side flanges and spaced longitudinal flanges on the tube forming strip being engaged and guided by the spaced circumferential grooves; and a locking strip guide on the base plate for guiding a longitudinally recessed locking strip, of resilient material, through the inlet opening to the annular space, the pressure rollers pressing the locking strip into engagement about the adjacent flanges of succeeding convolutions of the tube forming strip.

6. A machine according to claim 5 wherein:

glue applying means are mounted on the base plate for injecting glue into the longitudinal recess of the locking strip prior to its passage through the inlet opening.

7. A method of winding a tube from strip including the steps of:

introducing a tube forming strip into the annular space between a fixed cylindrical outer sleeve and a cylindrical core rotating coaxially within the outer sleeve;

guiding the tube forming strip by pressure means on the sleeve and entering the annular space, to form about the rotating core a helix with closely adjacent convolutions; and introducing a locking strip into the annular space and into engagement with the adjacent edge portions of the said adjacent convolutions.

8. A machine according to claim 4 or claim 5 wherein:

the shafts for the pressure rollers are inclined to the axis of the core;

the pressure rollers are of tough resilient material and have two succeeding annular ribs of lesser diameter than the remaining annular ribs to engage and press the locking strip into locking engagement with the side flanges of the convolutions.

9. A machine according to claim 5 wherein:

the core is encircled by a girdle of resilient material treaded with ribs substantially perpendicular to the convolutions of the helically-wound tube forming strip.

10. A machine according to claim 5 wherein:

each pressure roller is mounted on the outer sleeve for adjustment in a direction radial to the core.

* * * * *